(12) United States Patent  (10) Patent No.: US 8,649,070 B2
Takeda                    (45) Date of Patent:      Feb. 11, 2014

(54) IMAGE FORMING OPTICAL ELEMENT, IMAGE FORMING OPTICAL ARRAY, AND IMAGE READING DEVICE

(75) Inventor: Takashi Takeda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 13/353,673

(22) Filed: Jan. 19, 2012

(65) Prior Publication Data
US 2012/0188615 A1    Jul. 26, 2012

(30) Foreign Application Priority Data

Jan. 21, 2011 (JP) ................................. 2011-010591
Jan. 21, 2011 (JP) ................................. 2011-010592
Jan. 21, 2011 (JP) ................................. 2011-010593
Jan. 21, 2011 (JP) ................................. 2011-010746
Jan. 21, 2011 (JP) ................................. 2011-010747

(51) Int. Cl.
*H04N 1/04* (2006.01)
(52) U.S. Cl.
USPC ............ 358/475; 358/474; 358/498; 358/497

(58) Field of Classification Search
USPC .......................... 358/475, 474, 498, 497, 496
See application file for complete search history.

(56) References Cited

U.S. PATENT DOCUMENTS 5,907,438 A * 5/1999 Fujita et al. .................... 359/619

FOREIGN PATENT DOCUMENTS

JP            2000-066134 A    3/2000

* cited by examiner

*Primary Examiner* — Houshang Safaipour

(57) ABSTRACT

An image forming optical element is provided, in which an incident unit having a first lens face to which a light beam output from an original document (object) is input, an output unit having a second lens face outputting the light beam, and a bent unit connecting the incident unit and the output unit at an angle are integrally formed into a transparent medium. The bent unit has a reflection face reflecting the incident light beam input to the first lens face and guiding the light beam to the second lens face. The incident light beam is collected at any of the incident unit, the bent unit, and the output unit to form an intermediate image of the object, and the intermediate image is formed on the output side of the second lens face to form an erection image of the object.

21 Claims, 14 Drawing Sheets

FIG. 5

| | VARIATION 1 | VARIATION 2 | VARIATION 3 | VARIATION 4 | VARIATION 5 |
|---|---|---|---|---|---|
| LENS FACE S1 | ASPHERIC FACE | FREE CURVED FACE | FREE CURVED FACE | ASPHERIC FACE | FREE CURVED FACE |
| REFLECTION FACE S2 | FLAT FACE | FLAT FACE | ASPHERIC FACE | FREE CURVED FACE | FREE CURVED FACE |
| LENS FACE S3 | ASPHERIC FACE | FREE CURVED FACE | FREE CURVED FACE | ASPHERIC FACE | FREE CURVED FACE |

FIG. 7

| FACE NUMBER S | DESCRIPTION | MAIN CROSS-SECTIONAL CENTER CURVATURE r | FACE DISTANCE d | REFRACTIVE INDEX | ABBE NUMBER |
|---|---|---|---|---|---|
| | ORIGINAL DOCUMENT OB | ∞ | | | |
| 1 | ASPHERIC FACE | (FACE SHAPE IS SEPARATELY DESCRIBED) | 3.4 | 1.535 | 56.0 |
| 2 | REFLECTION FACE | ∞ | 1.0 | | |
| | INTERMEDIATE IMAGE | | 2.0 | | |
| 3 | ASPHERIC FACE | (FACE SHAPE IS SEPARATELY DESCRIBED) | 3.0 | | |
| | SENSOR FACE | ∞ | 3.4 | | |

* UNIT OF FACE DISTANCE d : mm

FIG. 8

FACE SHAPE OF LENS FACES S1 AND S3 (∗ LENS FACE S3 IS SYMMETRY TYPE
OF LENS FACE S1) DEFINITION FORMULA (XY POLYNOMIAL EXPRESSION FACE)

$$Z = \frac{cr^2}{1+\text{SQRT}[1-(1+k)c^2r^2]} + \sum_{j=2}^{66} C_j x^m y^n$$

$$j = [(m+n)^2 + m + 3n]/2 + 1$$

Z : SEG AMOUNT OF FACE PARALLEL TO z AXIS c : VERTEX RATE (CUY)

k : CONIC COEFFICIENT

Cj : COEFFICIENT OF MONOMIAL $x^m y^n$

FIG. 9

|  |  |  |
|---|---|---|
|  | Y CURVATURE RADIUS | 0.624159972 |
| C1 | CONIC CONSTANT | -0.894282269 |
| C2 | X (&X) | -0.00015382 |
| C3 | Y (&Y) | -0.026135423 |
| C4 | X**2 | -0.120926325 |
| C5 | X*Y | -0.000123886 |
| C6 | Y**2 | -0.119659606 |
| C7 | X**3 | 0.027754355 |
| C8 | X**2*Y | 0.067137919 |
| C9 | X Y**2 | -0.000446383 |
| C10 | Y**3 | 0.010214325 |
| C11 | X**4 | -0.062859758 |
| C12 | X**3*Y | 0.018182561 |
| C13 | X**2*Y**2 | -0.075151592 |
| C14 | X*Y**3 | 0.001005357 |
| C15 | Y**4 | -0.158245069 |
| C16 | X**5 | -0.310081403 |
| C17 | X**4*Y | -0.554009594 |
| C18 | X**3*Y**2 | 0.040846421 |
| C19 | X**2*Y**3 | 0.48440577 |
| C20 | X*Y**4 | 0.027611733 |
| C21 | Y**5 | 0.562165632 |
| C22 | X**6 | 0.234751102 |
| C23 | X**5*Y | -0.427629385 |
| C24 | X**4*Y**2 | -2.730140039 |
| C25 | X**3*Y**3 | 0.105125439 |
| C26 | X**2*Y**4 | 0.206114554 |
| C27 | X*Y**5 | 0.04255501 |
| C28 | Y**6 | 0.818415313 |
| C29 | X**7 | 1.146742484 |
| C30 | X**6*Y | 0.377536321 |

| | | |
|---|---|---|
| C31 | X**5*Y**2 | -0.575712398 |
| C32 | X**4*Y**3 | 9.799658804 |
| C33 | X**3*Y**4 | -0.426964827 |
| C34 | X**2*Y**5 | -8.34565101 |
| C35 | X*Y**6 | -0.282005983 |
| C36 | Y**7 | -1.787645231 |
| C37 | X**8 | 0.124483101 |
| C38 | X**7*Y | 1.391619685 |
| C39 | X**6*Y**2 | -2.718245028 |
| C40 | X**5*Y**3 | 0.11670952 |
| C41 | X**4*Y**4 | 43.21709604 |
| C42 | X**3*Y**5 | -2.047827784 |
| C43 | X**2*Y**6 | -17.17875053 |
| C44 | X*Y**7 | -0.555664275 |
| C45 | Y**8 | -1.734478418 |

"**" IN TABLE REPRESENTS EXPONENTIATION, AND SUBSEQUENT NUMBER REPRESENTS EXPONENT

THRESHOLD ANGLE $\theta = \sin^{-1}(1/nd) \approx 40.75° <$ MINIMUM INCIDENT ANGLE $\theta_{min}$

FIG. 11

| FACE NUMBER S | DESCRIPTION | MAIN CROSS-SECTIONAL CENTER CURVATURE r | FACE DISTANCE d | REFRACTIVE INDEX | ABBE NUMBER |
|---|---|---|---|---|---|
| | ORIGINAL DOCUMENT FACE OB | ∞ | | | |
| 1 | ASPHERIC FACE | (FACE SHAPE IS SEPARATELY DESCRIBED) | 3.4 | 1.535 | 56.0 |
| 2 | REFLECTION FACE | ∞ | 1.0 | | |
| | INTERMEDIATE IMAGE | | 2.0 | | |
| 3 | ASPHERIC FACE | (FACE SHAPE IS SEPARATELY DESCRIBED) | 3.0 | | |
| | SENSOR FACE | ∞ | 3.4 | | |

* UNIT OF FACE DISTANCE d : mm

FIG. 12

|     |                    |              |
| --- | ------------------ | ------------ |
| C1  | Y CURVATURE RADIUS | 0.619798138  |
|     | CONIC CONSTANT     | -0.884519842 |
| C2  | X (&X)             | 4.93E-05     |
| C3  | Y (&Y)             | -0.030349106 |
| C4  | X**2               | -0.127574323 |
| C5  | X*Y                | -0.000155016 |
| C6  | Y**2               | -0.125587392 |
| C7  | X**3               | 0.028595558  |
| C8  | X**2*Y             | 0.081715863  |
| C9  | X Y**2             | 0.000709899  |
| C10 | Y**3               | 0.02857438   |
| C11 | X**4               | -0.065650949 |
| C12 | X**3*Y             | -0.002488563 |
| C13 | X**2*Y**2          | 0.015721804  |
| C14 | X*Y**3             | 0.01171372   |
| C15 | Y**4               | -0.076825741 |
| C16 | X**5               | -0.452966727 |
| C17 | X**4*Y             | -0.469330297 |
| C18 | X**3*Y**2          | -0.068213365 |
| C19 | X**2*Y**3          | -0.132536456 |
| C20 | X*Y**4             | -0.005851957 |
| C21 | Y**5               | 0.396724721  |
| C22 | X**6               | 0.785826351  |
| C23 | X**5*Y             | 0.260960239  |
| C24 | X**4*Y**2          | -3.696641662 |
| C25 | X**3*Y**3          | 0.030421952  |
| C26 | X**2*Y**4          | -2.316220152 |
| C27 | X*Y**5             | -0.12072296  |
| C28 | Y**6               | -0.988720159 |
| C29 | X**7               | 2.642971787  |
| C30 | X**6*Y             | 1.042998107  |

|     |           |              |
| --- | --------- | ------------ |
| C31 | X**5*Y**2 | -0.248007462 |
| C32 | X**4*Y**3 | 0.143885812  |
| C33 | X**3*Y**4 | 0.679700036  |
| C34 | X**2*Y**5 | -3.316788649 |
| C35 | X*Y**6    | -0.059465531 |
| C36 | Y**7      | -1.843965106 |
| C37 | X**8      | -5.453765911 |
| C38 | X**7*Y    | -1.954712857 |
| C39 | X**6*Y**2 | -4.841612375 |
| C40 | X**5*Y**3 | -6.095090874 |
| C41 | X**4*Y**4 | 79.35926608  |
| C42 | X**3*Y**5 | 2.799186075  |
| C43 | X**2*Y**6 | -0.377156228 |
| C44 | X*Y**7    | -0.154617494 |
| C45 | Y**8      | 8.873465231  |

"**" IN TABLE REPRESENTS EXPONENTIATION, AND SUBSEQUENT NUMBER REPRESENTS EXPONENT

IMAGE FORMING OPTICAL ELEMENT, IMAGE FORMING OPTICAL ARRAY, AND IMAGE READING DEVICE

CROSS REFERENCES TO RELATED APPLICATIONS

The entire disclosure of Japanese Patent Application Nos. 2011-010591, filed Jan. 21, 2011, 2011-010592, filed Jan. 21, 2011, 2011-010593, filed Jan. 21, 2011, 2011-010746, filed Jan. 21, 2011 and 2011-010747, filed Jan. 21, 2011 are expressly incorporated by reference herein.

BACKGROUND

1. Technical Field

The present invention relates to an image forming optical element that forms an erected image of an object, an image forming optical array, and an image reading device that reads an image of an object using the image forming optical element.

2. Related Art

In an image scanner, a facsimile, a copier, a financial terminal device, a contact image sensor module (hereinafter, referred to as "CIS module") is used as an image reading device. The CIS module has a light source unit that irradiates a reading target with light, an image forming optical unit that forms a erection equal-magnification image of the reading target, and an optical sensor that reads the erection equal-magnification image formed in the image forming optical unit, and disposition relationship between the image forming optical unit and the optical sensor is fixed. This is one of main factors decreasing the degree of freedom in disposition of the optical sensor. For example, as described in JP-A-2000-66134, it is proposed that a reflection member is disposed on an image forming side of a roof prism lens array, an image forming side optical axis is bent such that a positional range in which the optical sensor can be disposed drastically spreads.

However, in the roof prism lens array, an object side lens face and an image forming side lens face are perpendicularly disposed, a structure in which a ridge is disposed to be 45° with respect to a plane including the optical axes of two lenses is employed, and thus it is difficult to avoid complication of the image forming optical unit. To satisfactorily obtain the erection image of the reading target, it is necessary to determine the position of the ridge with high precision and to adjust the relative positional relationship with the reflection member with high precision.

SUMMARY

An advantage of some aspects of the invention is to provide a technique in which high precision positioning is not necessary with a simple configuration.

Application Example 1

According to an aspect of the invention, there is provided an image forming optical element in which an incident unit having a first lens face to which a light beam output from an object is input, an output unit having a second lens face outputting the light beam, and a bent unit connecting the incident unit and the output unit at an angle are integrally formed into a transparent medium, wherein the bent unit has a reflection face reflecting an incident light beam input to the first lens face and guiding the incident light beam to the second lens face, and wherein an intermediate image of the object is formed in any of the incident unit, the bent unit, and the output unit, and the intermediate image is formed to form an erection image of the object on an output side of the second lens face.

With such a configuration, the image forming optical element is integrally formed into a transparent medium such that the incident unit having the first lens face and the output unit having the second lens face are connected at an angle by the bent unit. The bent unit is provided with the reflection face, the incident light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in a device or the like, it is not necessary to match the relative positions of the incident unit, the output unit, and the bent unit, it is not necessary to perform positioning of the image forming optical element with high precision, and thus it is possible to simply configure the image forming optical element.

Application Example 2

In the image forming optical element according to the application example, a reflection film may be disposed on an outer peripheral face of the bent unit to form the reflection face.

With such a configuration, the reflection film is disposed at the outer peripheral portion of the bent unit integrally formed with the incident unit and the output unit, and thus it is possible to form the relative positional relationship of the incident unit, the reflection film, and the output unit with high precision.

Application Example 3

In the image forming optical element according to the application example, the outer peripheral face of the bent unit may have a plane shape, the first lens face and the second lens face may have face shapes symmetric with each other, and the erection image of the object may be formed at equal magnification.

With such a configuration, it is possible to form an erection equal-magnification image with high precision by the symmetric face shape.

Application Example 4

In the image forming optical element according to the application example, the outer peripheral face of the bent unit may have a curved shape.

With such a configuration, the reflection face is a curved face and has power, and thus the image forming optical element is miniaturized and performance of forming an image is improved.

Application Example 5

According to another aspect of the invention, there is provided an image forming optical array, wherein a plurality of the image forming optical elements are integrally arranged._

With such a configuration, the image forming optical element is integrally formed into the transparent medium such that the incident unit having the first lens face and the output unit having the second lens face are connected at an angle by the bent unit. The bent unit is provided with the reflection face, and the light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in the image forming optical array, it is not necessary to match the relative positions of the incident unit, the output unit, and the bent unit, it is not necessary to perform positioning of the image forming optical element with high precision, and thus it is possible to simply configure the image forming optical element, and it is possible to easily and efficiently form the erection image of the object based on an image forming optical system without decreasing efficiency of using light since there is no air in an optical path from the incident unit to the output unit.

Application Example 6

In the image forming optical array according to the application example, the plurality of lens may be integrally shaped to form a lens array, and a plurality of the reflection films may be integrally provided on outer peripheral faces of a plurality of the bent units.

Application Example 7

In the image forming optical array according to the application example, at least one of the first lens face and the second lens face may have a face shape different in an arrangement direction of arranging the image forming optical elements and a perpendicular direction perpendicular to the arrangement direction.

With such a configuration, a curvature is dissimilated in the arrangement direction and the perpendicular direction to easily improve MTF (Modulation Transfer Function), and it is possible to obtain performance of forming an image with high precision.

Application Example 8

According to still another aspect of the invention, there is provided an image reading device including: a light source unit that irradiates an object with light; the image forming optical element according to the application example 2; and a reading unit that reads an erection image formed by the image forming optical element.

With such a configuration, the image forming optical element is integrally formed into a transparent medium such that the incident unit having the first lens face and the output unit having the second lens face are connected at an angle by the bent unit. The bent unit is provided with the reflection face, the incident light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in the image reading device, it is not necessary to match the relative positions of the incident unit, the output unit, and the bent unit, it is not necessary to perform positioning of the image forming optical element with high precision, and thus it is possible to simply configure the image forming optical element, and it is possible to easily and efficiently form the erection image of the object based on an image forming optical system without decreasing efficiency of using light since there is no air in an optical path from the incident unit to the output unit.

Application Example 9

In the image forming optical element according to the application example, the reflection face may be a total reflection face that totally reflects the light.

With such a configuration, since there is no air in the optical path from the incident unit and the output unit, and thus it is possible to suppress a decrease of efficiency of using light.

Application Example 10

In the image forming optical element according to the application example, the total reflection face may have a plane shape, the first lens face and the second lens face may have face shapes symmetric with each other, and the erection image of the object may be formed at equal magnification.

With such a configuration, it is possible to form an erection equal-magnification image with high precision by the symmetric face shape.

Application Example 11

In the image forming optical element according to the application example, the total reflection face may have a curved shape.

With such a configuration, the reflection face is a curved face and has power, and thus the image forming optical element is miniaturized and performance of forming an image is improved.

Application Example 12

According to still another aspect of the invention, there is provided an image forming optical array, wherein the plurality of image forming optical elements are integrally arranged.

With such a configuration, the image forming optical element is integrally formed into a transparent medium such that the incident unit having the first lens face and the output unit having the second lens face are connected at an angle by the bent unit. The bent unit is provided with the reflection face, the light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in the image forming optical array, it is not necessary to match the relative positions of the incident unit, the output unit, and the bent unit, it is not necessary to perform positioning of the image forming optical element with high precision, and thus it is possible to simply configure the image forming optical element, and it is possible to easily and efficiently form the erection image of the object based on an image forming optical system without decreasing efficiency of using light since there is no air in an optical path from the incident unit to the output unit.

Application Example 13

In the image forming optical array according to the application example, at least one of the incident side lens face and the second lens face may have a face shape different in an arrangement direction of arranging the image forming optical elements and a perpendicular direction perpendicular to the arrangement direction.

With such a configuration, a curvature is dissimilated in the arrangement direction and the perpendicular direction to easily improve MTF, and it is possible to obtain performance of forming an image with high precision.

Application Example 14

According to still another aspect of the invention, there is provided an image reading device including: a light source unit that irradiates an object with light; the image forming optical element according to the application example 9; and a reading unit that reads an erection image formed by the image forming optical element.

With such a configuration, the image forming optical element is integrally formed into the transparent medium such that the incident unit having the first lens face and the output unit having the second lens face are connected at an angle by the bent unit. The bent unit is provided with the reflection face, and the light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in the image reading device, it is not necessary to match the relative positions of the incident unit, the output unit, and the bent unit, it is not necessary to perform positioning of the image forming optical element with high precision, and thus it is possible to simply configure the image forming optical element, and it is possible to easily and efficiently form the erection image of the object based on an image forming optical system without decreasing efficiency of using light since there is no air in an optical path from the incident unit to the output unit.

Application Example 15

In the image forming optical element according to the application example, a position of forming the intermediate image of the object may be a position between the reflection face and the second lens face.

With such a configuration, since the incident light beam is bent between the first lens face and the intermediate image by the reflection face, it is possible to thin the image forming optical element in a direction from the object to the first lens face. For example, it is possible to bend the incident light beam on the reflection face substantially at the perpendicular angle, that is, to dispose the incident unit and the output unit to be substantially perpendicular to each other, and thus it is possible to thin the image forming optical element.

Application Example 16

In the image forming optical element according to the application example, a reflection film may be disposed on an outer peripheral face of the bent unit to form the reflection face.

With such a configuration, the reflection film is formed on the reflection face, it is possible to obtain high reflection efficiency, and thus it is possible to reduce loss of light quantity occurring at the time of reflecting.

Application Example 17

In the image forming optical element according to the application example, a total reflection face that totally reflects the incident light beam may be formed as the reflection face in the bent unit.

With such a configuration, since the total reflection is used on the reflection face, it is possible to reduce loss of light quantity.

Application Example 18

In the image forming optical element according to the application example, the reflection face may have a plane shape, the first lens face and the second lens face may have face shapes symmetric with each other, and the erection image of the object may be formed at equal magnification.

With such a configuration, it is possible to form an erection equal-magnification image with high precision by the symmetric face shape.

Application Example 19

In the image forming optical element according to the application example, the reflection face may have a curved shape.

With such a configuration, the reflection face has a curved face and has power, and thus the image forming optical element is miniaturized and performance of forming an image is improved.

Application Example 20

According to still another aspect of the invention, there is provided an image forming optical array, wherein a plurality of the image forming optical elements according to Application Example 15 are integrally arranged.

With such a configuration, the image forming optical element is integrally formed into the transparent medium such that the incident unit having the first lens face and the output unit having the second lens face are connected at an angle by the bent unit. The bent unit is provided with the reflection face, and the light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in the image forming optical array, it is not necessary to match the relative positions of the incident unit, the output unit, and the bent unit, it is not necessary to perform positioning of the image forming optical element with high precision, and thus it is possible to simply configure the image forming optical element, and it is possible to easily and efficiently form the erection image of the object based on an image forming optical system without decreasing efficiency of using light since there is no air in an optical path from the incident unit to the output unit.

Application Example 21

In the image forming optical array according to the application example, at least one of the first lens face and the second lens face may have a face shape different in an arrangement direction of arranging the image forming optical elements and a perpendicular direction perpendicular to the arrangement direction.

With such a configuration, a curvature is dissimilated in the arrangement direction and the perpendicular direction to easily improve MTF, and it is possible to obtain performance of forming an image with high precision.

Application Example 22

According to still another aspect of the invention, there is provided an image reading device including: a light source unit that irradiates an object with light; the image forming optical element according to Application Example 15; and a reading unit that reads an erection image formed by the image forming optical element.

With such a configuration, the image forming optical element is integrally formed into the transparent medium such that the incident unit having the first lens face and the output unit having the second lens face are connected at an angle by the bent unit. The bent unit is provided with the reflection face, and the light beam input to the lens through the first lens face is reflected by the reflection face of the bent unit to be guided to the second lens face. As described above, the incident light beam travels into the image forming optical element while being bent in the image forming optical element. The incident light beam forms an intermediate image in any of the incident unit, the bent unit, and the output unit, and the intermediate image is formed by the second lens face to form the erection image of the object.

Accordingly, in the image forming optical element, the incident unit, the output unit, and the bent unit including the reflection face are integrally formed. Therefore, when the image forming optical element is provided in the image reading device, it is not necessary to match the relative positions of the incident unit, the output unit, and the bent unit, it is not necessary to perform positioning of the image forming optical element with high precision, and thus it is possible to simply configure the image forming optical element, and it is possible to easily and efficiently form the erection image of the object based on an image forming optical system without decreasing efficiency of using light since there is no air in an optical path from the incident unit to the output unit.

BRIEF DESCRIPTION OF THE DRAWINGS

The invention will be described with reference to the accompanying drawings, wherein like numbers reference like elements.

FIG. 5 is a diagram illustrating combination of a lens face and a reflection face.

FIG. 7 is a diagram illustrating lens data of variation 1.

FIG. 8 is a diagram illustrating a numerical formula defining a face shape of a lens face.

FIG. 9 is a diagram illustrating data providing a face shape of a lens face in variation 1.

FIG. 11 is a diagram illustrating lens data of another specific example.

FIG. 12 is a diagram illustrating data providing a face shape of a lens face in another specific example.

DESCRIPTION OF EXEMPLARY EMBODIMENTS

Embodiments of the invention will be described, the invention is not limited to the following embodiments, but may be appropriately modified within the scope of the concept of the invention, and all the modifications are included in the technical scope of the invention.

Figure 1:
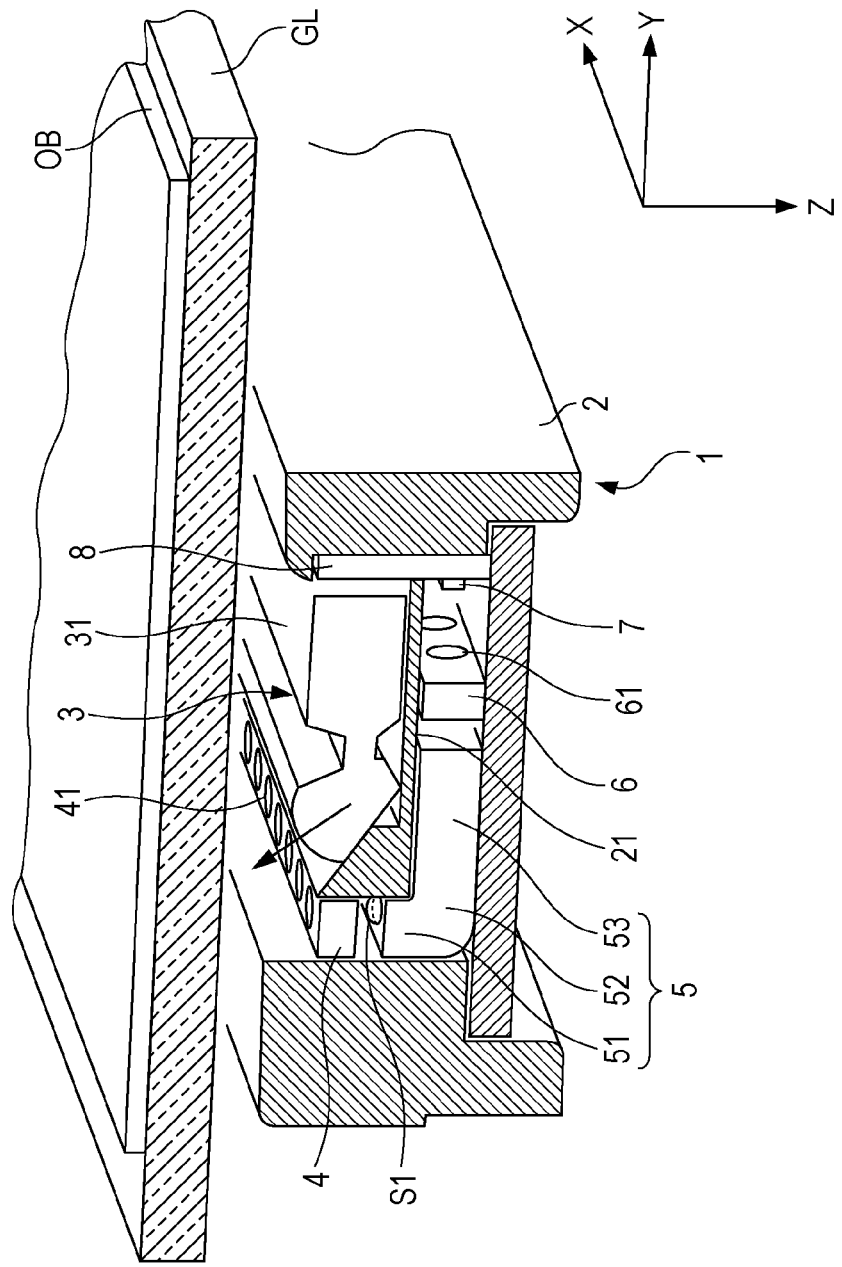
FIG. 1 is a partial cross-sectional perspective view illustrating a CIS module of an image reading device according to a first embodiment of the invention.
Figure 2:
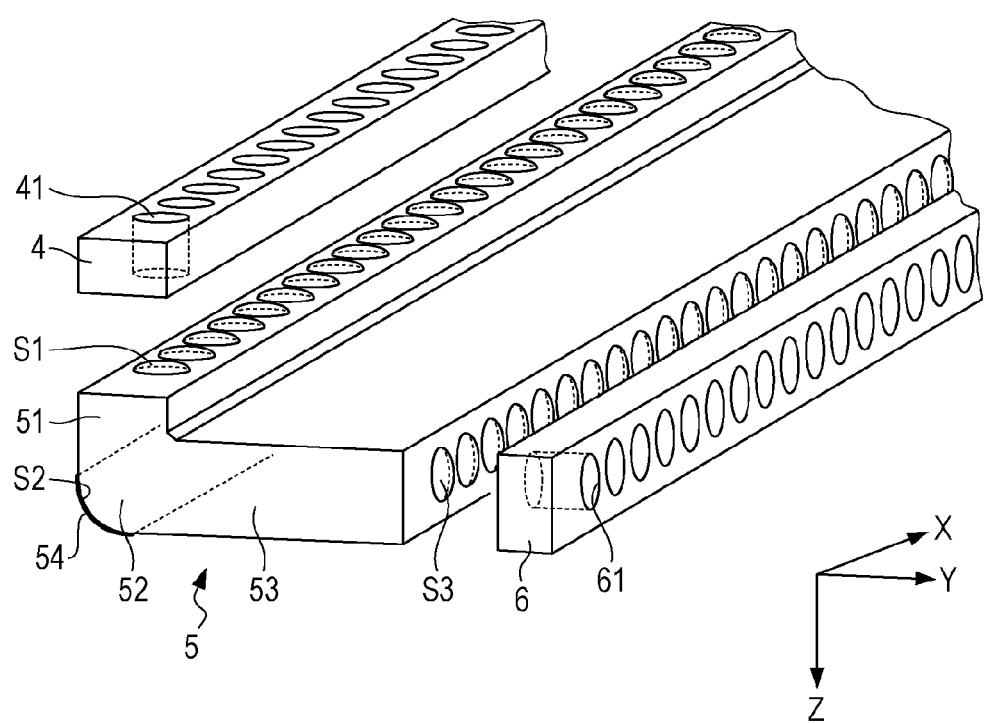
FIG. 2 is a perspective view illustrating an incident side aperture member, a lens array, and an output side aperture member of the CIS module.

FIG. 1 is a partial cross-sectional perspective view illustrating a CIS module of an image reading device according to a first embodiment of the invention. FIG. 2 is a perspective view illustrating an incident side aperture member, a lens array, and an output side aperture member in the CIS module shown in FIG. 1. The CIS module 1 is a device that reads an original document OB placed on an original document glass GL to read an image printed on the original document OB as a reading target, and is disposed just under the original document glass GL. The CIS module 1 has a rectangular frame 2 extending longer than a reading range of the original document OB in an X direction, and is provided with a light source unit 3, an incident side aperture member 4, a lens array 5, an output side aperture member 6, a sensor 7, and a printed circuit board 8 in the frame 2.

A separator 21 is disposed in the frame 2, and thus an internal space of the frame 2 is separated into an upper space for disposing the light source unit 3, a lower space positioned under the upper space, and a vertical space adjacent to the upper space and the lower space. The lower space and the vertical space communicate with each other to form a communication space having a substantially L shape including a cross section (hereinafter, referred to as "sub-scanning cross section") including a Y direction perpendicular to the X direction and an up and down direction Z. The incident side aperture member 4, the lens array 5, the output side aperture member 6, and the sensor 7 are disposed in the space.

In the light source unit 3, an LED (Light Emitting Diode) (not shown) provided on the printed circuit board 8 is a light source, and illumination light output from the LED is given to one end of a light guide 31. The light guide 31 has a length substantially equal to a reading range on the upper face of the separator 21, and is provided along the X direction. When the illumination light from the LED is input to one end of the light guide 31, the illumination light propagates in the light guide 31 to the other end of the light guide 31. At each portion of the light guide 31 in the X direction, a part of the illumination light propagating in such a manner is output from a leading end 32 (light output face) of the light guide 31 to the original document glass GL, and is irradiated to the original document OB on the original document glass GL. In such a manner, the stripe-shaped illumination light extending in the X direction is irradiated to the original document OB, and is reflected by the original document OB.

At the position just under the irradiation position of the illumination light, the vertical space described above is provided, and the incident side aperture member 4 is disposed at the upper end portion. The incident side aperture member 4 has substantially the same length as the reading range, and is provided along the X direction. The incident side aperture member 4 is provided a plurality of through-holes 41 in a line in the X direction, to serve as the incident side aperture with respect to a plurality of incident side lens face S1 provided in each lens array 5. In FIG. 2, the whole aperture is shown only on the front side of the plurality of incident side apertures 41, and only the upper openings of the incident side apertures 41 are shown for the others. This point is the same for the output side apertures 61 to be described later.

The lens array 5 has a substantially L shape on the sub-scanning cross section (YZ plane). The lens array 5 has substantially the same length as the reading range and is provided along the X direction, and the whole lens array 5 can be completely inserted into a communication space. More specifically, as shown in FIG. 2, the lens array 5 has the incident unit 51 provided along the up and down direction Z, the output unit 53 provided along the horizontal direction, the bent portion (connection portion) 52 connecting the incident unit 51 and the output unit 53 at an angle to each other, for example, substantially at a perpendicular angle, and is integrally formed by a transparent medium such as resin and glass having optical permeability with respect to the illumination light.

On the upper face of the incident unit 51, the incident side lens faces S1 are provided at the same pitch as that of the apertures 41 in the X direction and in a line to correspond to, one-to-one, the incident side apertures 41 as shown in FIG. 2. The light beams passing through the incident side apertures 41 among the light beams reflected by the original document OB are input to the incident side lens faces S1 corresponding thereto, and travel from the incident unit 51 to the connection unit 52 while converging by the incident side lens faces S1.

A reflection film 54 is formed on the outer peripheral face of the connection unit 52. By the formation of the reflection film 54, the reflection face S2 is configured in the X direction in the connection unit 52 to substantially the same extent as the reading range, and the incident light beam input to the incident side lens face S1 is reflected and guided to the output side lens face S3 of the output unit 53. As the reflection film 54, the known film, for example, a vapor-metallized film may be employed. In the embodiment, as shown in FIG. 1 and FIG. 2, the length of the incident unit 51 along the optical axis of the image forming optical system formed of the incident side lens face S1, the reflection face S2, and the output side lens face S3 is drastically shorter than the length of the output unit 53, the incident light beam is reflected by the reflection film 54, and then is collected in the output unit 53 to form the intermediate image of the original document OB.

The output side lens faces S3 are provided in a line in the X direction with the same number as that of the incident side lens faces S1 and at the same pitch, on the anti-connection unit side of the output unit 53. On the anti-connection portion side (right side of FIG. 1 and FIG. 2) of the output unit 53, the output side aperture member 6 is disposed in the lower space, that is, just under the light guide 31, to be interposed between the lens array 5 and the sensor 7. The output side aperture member 6 also has substantially the same length as the reading range in the same manner as the incident side aperture member 4 and is provided along the X direction, and a plurality of through-holes 61 are provided in a line in the X direction and serves as the output side apertures for the output side lens faces S3. For this reason, the output side lens faces S3 form the intermediate images corresponding thereto on the sensor face 71 (see FIG. 6) of the sensor 7 to form the erection image of the original document OB.

As shown in FIG. 1, the sensor 7 is mounted on the printed circuit board 8 provided with the LED, reads the erection image of the original document OB, and outputs a signal related to the erection image.

As described above, in the first embodiment, the incident unit 51 having the first lens face S1 and the output unit 53 having the second lens face S3 are integrally formed into a transparent medium to be connected at an angle by the connection unit 52. The connection unit 52 is provided with the reflection face S2, the light beam input through the first lens face S1 is reflected by the reflection face S2, is guided to the second lens face S3, and is collected between the reflection face S2 and the second lens face S3, to form the intermediate image of the object. The intermediate image is formed by the second lens face S3, and the erection image of the original document OB is formed on the sensor face 71. Accordingly, the loss of light is suppressed, and it is possible to form the bright erection image.

The intermediate image is formed on the side closer to the output side lens face than the reflection face S2 with respect to the optical axis of the image forming optical system formed of the incident side lens face S1, the reflection face S2, and the output side lens face S3. That is, the incident light beam is bent by the reflection face S2 on the side closer to the incident side lens face than the position (IMP shown in FIG. 6) of forming the intermediate image. As a result, it is possible to make the lens array 5 thin in the direction from the original document OB to the first lens face S1, that is, the up and down direction Z.

The structure is simpler than that of the image forming optical element described in JP-A-2000-66134 using the roof prism, and it is possible to form the erection image without requiring the positioning with high precision with respect to the ridge or the reflection member which is essential in the same image forming optical element.

The connection unit 52 provided with the reflection face S2 formed by evaporating the reflection film 54 is integrally formed with the incident unit 51 and the output unit 53, and thus it is possible to set the relative positional relationship of the incident side lens face S1, the reflection face S2, and the output side lens face S3 with high precision. In addition, the number of components is small, and an assembly property is satisfactory.

In the embodiment, since the length of the incident unit 51 along the optical axis of the image forming optical system is drastically shorter than the length of the output unit 53, the CIS module 1 can be thinner in the up and down direction Z. As a result, it is possible to miniaturize a module-mounted device such as an image scanner, a facsimile, and a copier provided with the CIS module 1.

In the embodiment configured as described above, the sensor 7 corresponds to "reading unit" of the invention. The incident side lens face S1, the reflection face S2, and the output side lens face S3 correspond to "first lens face", "reflection face", and "second lens face", respectively. The face shapes of the lens faces S1 and S3 are arbitrary, but it is preferable to have different face shapes in the arrangement direction X and the perpendicular direction Y perpendicular thereto. It is because the MTF is improved and the image forming performance is raised. This point is the same as the case of the reflection face S2 formed on a curved shape to be described later.

Since the reflection face S2 is formed on the outer peripheral face of the connection unit 52, the outer peripheral face of the connection unit 52 is finished in a plane shape, the reflection face S2 becomes a plane. When the outer peripheral face of the connection unit 52 is finished in a curved shape, the reflection face S2 becomes a curved face (concave face) and has power. The shape of the reflection face S2 is not particularly limited, and any of the plane and the curved face may be used. However, the incident side lens face S1 and the output side lens face S3 may be set as shown in FIG. 5 according to whether the reflection face S2 is the plane or the curved face.

Figure 3:
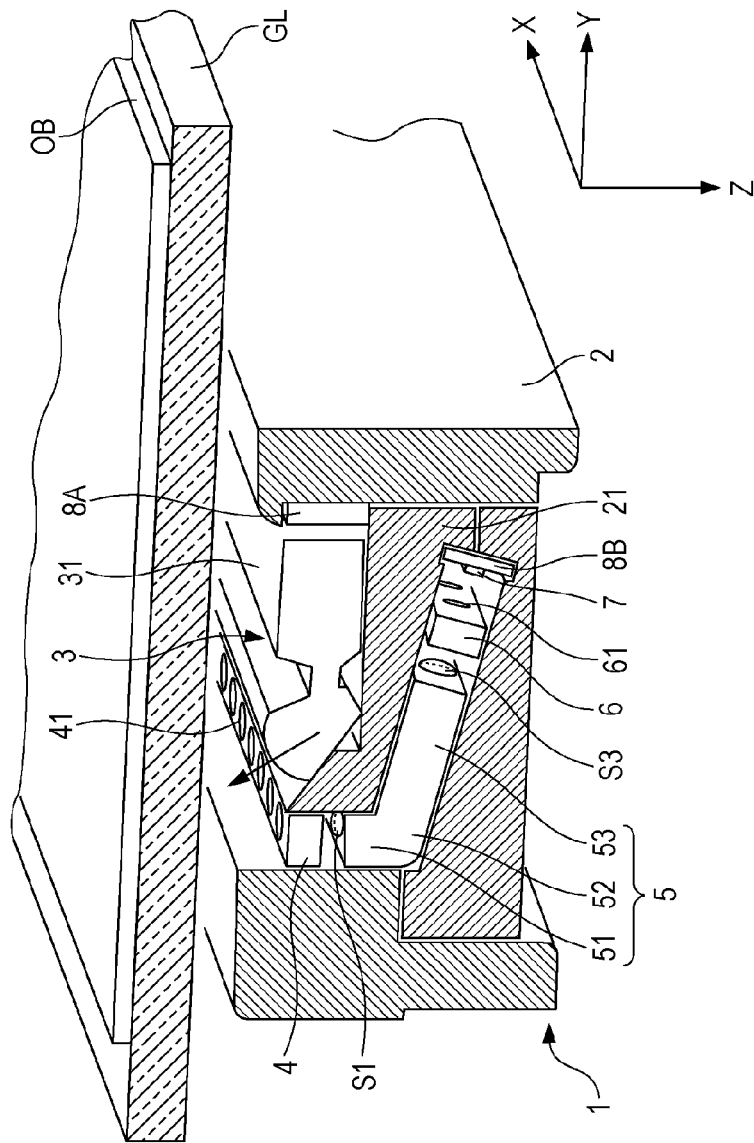
FIG. 3 is a partial cross-sectional perspective view illustrating a CIS module of an image reading device according to a second embodiment of the invention.
Figure 4:
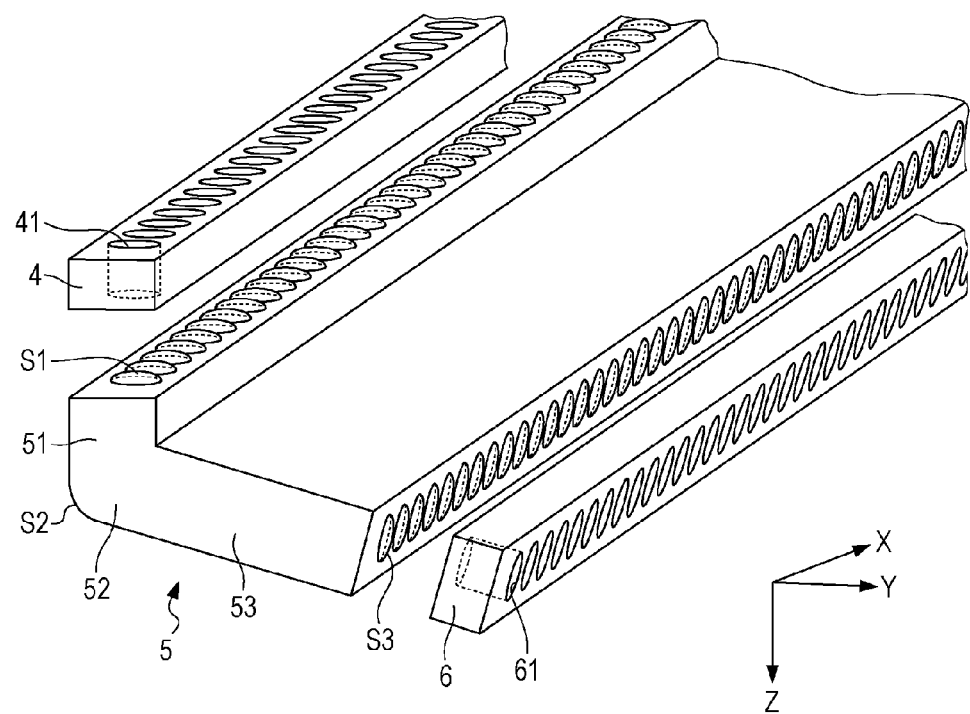
FIG. 4 is a perspective view illustrating an incident side aperture member, a lens array, and an output side aperture member of the CIS module.

FIG. 3 is a partial cross-sectional perspective view illustrating the CIS module of the image reading device according to a second embodiment of the invention. FIG. 4 is a perspective diagram illustrating the incident side aperture member, the lens array 5, and the output side aperture member in the CIS module shown in FIG. 3. The CIS module 1 is a device that reads an original document OB placed on an original document glass GL to read an image printed on the original document OB as a reading target, and is disposed just under the original document glass GL. The CIS module 1 has a rectangular frame 2 extending longer than a reading range of the original document OB in an X direction, and is provided with a light source unit 3, an incident side aperture member 4, a lens array 5, an output side aperture member 6, a sensor 7, and printed circuit boards 8A and 8B in the frame 2.

A separator 21 is disposed in the frame 2, and thus an internal space of the frame 2 is separated into an upper space for disposing the light source unit 3, a lower space positioned under the upper space, and a vertical space adjacent to the upper space and the lower space. The lower space is formed to be inclined downward according to the travel from the vertical space side (left side shown in FIG. 3) to the anti-vertical space side (right side shown in FIG. 3), that is, in the Y direction. The lower space and the vertical space communicate with each other to form a communication space having a substantially L shape (L shape in which narrow angle is obtuse angle) including a cross section (hereinafter, referred to as "sub-scanning cross section") including a Y direction perpendicular to the X direction and an up and down direction Z, and the incident side aperture member 4, the lens array 5, the output side aperture member 6, the sensor 7, and the printed circuit board 8B are disposed therein.

In the light source unit 3, an LED (not shown) provided on the printed circuit board 8 is set to a light source, and illumination light output from the LED is given to one end of a light guide 31. The light guide 31 has a length substantially equal to a reading range on the upper face of the separator 21, and is provided along the X direction. When the illumination light from the LED is input to one end of the light guide 31, the illumination light propagates in the light guide 31 to the other end of the light guide 31. At each portion of the light guide 31 in the X direction, a part of the illumination light propagating in such a manner is output from a leading end 32 of the light guide 31 to the original document glass GL, and is irradiated to the original document OB on the original document glass GL. In such a manner, the stripe-shaped illumination light extending in the X direction is irradiated to the original document OB, and is reflected by the original document OB.

At the position just under the irradiation position of the illumination light, the vertical space described above is provided, and the incident side aperture member 4 is disposed at the upper end portion. The incident side aperture member 4 has substantially the same length as the reading range, and is provided along the X direction. The incident side aperture member 4 is provided a plurality of through-holes 41 in a line in the X direction, to serve as the incident side aperture with respect to a plurality of incident side lens face S1 provided in each lens array 5. In FIG. 4, the whole aperture is shown only on the front side of the plurality of incident side apertures 41, and only the upper openings of the incident side apertures 41 are shown for the others. This point is the same for the output side apertures 61 to be described later.

The lens array 5 has a substantially L shape (L shape in which narrow angle is obtuse angle) on the sub-scanning cross section (YZ plane), has substantially the same length as the reading range, and is provided along the X direction, and the whole lens array 5 can be completely inserted into a communication space. More specifically, as shown in FIG. 4, the lens array 5 has the incident unit 51 provided along the up and down direction Z, the output unit 53 provided along the horizontal direction, the connection portion 52 inclining and connecting the output unit 53 to the incident unit 51, and is integrally formed by a transparent medium such as resin and glass having optical permeability with respect to the illumination light. More specifically, as shown in FIG. 4, the incident unit 51 is provided along the up and down direction Z, and the output unit 53 is inclined downward according to the travel from the lower end portion of the incident unit 51 in the Y direction. The reason for such a configuration is because the incident light is totally reflected by the connection unit 52, and will be described later.

On the upper face of the incident unit 51, the incident side lens faces S1 are provided at the same pitch as that of the apertures 41 in the X direction and in a line to correspond to, one-to-one, the incident side apertures 41 as shown in FIG. 4. For this reason, the light beams passing through the incident side apertures 41 among the light beams reflected by the original document OB are input to the incident side lens faces S1 corresponding thereto, and travel from the incident unit 51 to the connection unit 52 while converging by the incident side lens faces S1.

The connection unit 52 connects the output unit 53 to the incident unit 51 to be inclined, and an angle formed by the optical axis of the incident unit 51 side and the optical axis of the output side lens face S3 side is over 90°. Each unit of the outer peripheral face of the connection unit 52 is designed such that the incident angle θ of the light beam guided through the incident unit 51 to the portion is equal to or more than a threshold angle. As a result, the whole of the incident light beam is totally reflected on the outer peripheral face of the connection unit 52. For this reason, the incident light beam input to the incident side lens face S1 is not output from the connection unit 52, and it is possible to guide the light beam to the output side lens face S3 of the output unit 53 while suppressing the loss of light quantity based on the reflection in the connection unit 52. As described above, the outer peripheral face of the connection unit 52 is the total reflection face S2.

When the incident light beam is reflected by the connection unit 52 and is guided to the output side lens face S3 of the output unit 53, the reflection film may be provided on the outer peripheral face of the connection unit 52. In this case, since the incident light beam is output once from the outer peripheral face of the connection unit 52 and is reflected on the surface of the reflection film, it is difficult to avoid the loss of light but it is possible to suppress the loss of light by total reflection. Further, it is possible to reduce a cost of the lens array 5 as much as the reflection film is not necessary, which is preferable.

In the embodiment, as shown in FIG. 3 and FIG. 4, the length of the incident unit 51 along the optical axis of the image forming optical system formed of the incident side lens face S1, the total reflection face S2, and the output side lens face S3 is drastically shorter than the length of the output unit 53, the incident light beam is totally reflected on the outer peripheral face of the connection unit 52, and then is collected in the output unit 53 to form the intermediate image of the original document OB.

The output side lens faces S3 are provided in a line in the X direction with the same number as that of the incident side lens faces S1 and at the same pitch, on the anti-connection unit side (right side of FIG. 3 and FIG. 4) of the output unit 53.

On the anti-connection portion side of the output unit 53, the output side aperture member 6 is disposed in the lower space, that is, just under the light guide 31, to be interposed between the lens array 5 and the sensor 7. The output side aperture member 6 also has substantially the same length as the reading range in the same manner as the incident side aperture member 4 and is provided along the X direction, and a plurality of through-holes 61 are provided in a line in the X direction and serves as the output side apertures for the output side lens faces S3. For this reason, the output side lens faces S3 form the intermediate images corresponding thereto on the sensor face 71 (see FIG. 4) of the sensor 7 to form the erection image of the original document OB.

As shown in FIG. 3, the sensor 7 is mounted on the other printed circuit board 8B different from the printed circuit board 8A provided with the LED, reads the erection image of the original document OB, and outputs a signal related to the erection image.

As described above, even in the second embodiment, similarly to the first embodiment, the connection unit 52 connecting the incident unit 51 and the output unit 53 is provided with the total reflection face S2, the incident light beam is guided to the second lens face S3 by the total reflection face S2 and is collected between the total reflection face S2 and the second lens face S3 to form the intermediate image of the object, and the image is formed on the sensor face 71 by the second lens face S3 to form the erection image of the original document OB. Accordingly, the loss of light is suppressed, and it is possible to form the bright erection image. Since the incident light beam is reflected by the total reflection face S2 of the connection unit 52, it is possible to further suppress the loss of light as compared with the first embodiment, and it is possible to obtain a brighter erection image.

The face shapes of the lens faces S1 and S3 in the first embodiment and the second embodiment are arbitrary, but it is preferable to have different face shapes in the arrangement direction X and the perpendicular direction Y perpendicular thereto. It is because the MTF is improved and the image forming performance is raised. This point is the same as the case of the reflection face S2 in the first embodiment and the total reflection face S2 in the second embodiment, which are formed on a curved shape to be described later. In the following description, the general term of the reflection face S2 in the first embodiment and the total reflection face S2 in the second embodiment is merely "reflection face S2". However, when both is discriminated, they are referred to as "reflection face S2 based on film formation" and "total reflection face S2".

Since the reflection face S2 is formed on the outer peripheral face of the connection unit 52, the reflection face S2 is a plane when the outer peripheral face of the connection unit 52 is finished in the plane shape, and the reflection face S2 is a curved face (concave face) when the outer peripheral face is finished in a curved shape, to have power. The shape of the reflection face S2 is not particularly limited, any of the plane and the curved face may be used. However, the incident side lens face S1 and the output side lens face S3 may be set as shown in FIG. 5 according to whether the reflection face S2 is the plane or the curved face.

FIG. 5 is a diagram illustrating combination of the lens face and the reflection face. As shown in variation 1 in FIG. 5, when the reflection face S2 is the plane, the incident side lens face S1 and the output side lens face S3 can be aspheric faces together, and it is possible to obtain the erection equal-magnification images formed substantially in the same shape (however, both lens faces are symmetrically disposed). Since the reflection face S2 is the plane, it is possible to exclude a decrease of resolution caused by the reflection face S2.

As shown in variation 2 in FIG. 5, the incident side lens face S1 and the output side lens face S3 may be free curved faces together. The "free curved face" means a curved face which cannot be defined by a simple calculation formula. In this case, since the reflection face S2 is the plane, it is possible to exclude the decrease of resolution caused by the reflection face S2 in the same manner as variation 1, but the lens faces S1 and S3 are the free curved faces, and thus it is possible to form the erection equal-magnification image while suppressing aberration or the like as compared with variation 1.

As shown in variation 3 to variation 5 in FIG. 5, the reflection face S2 may be configured by a concave face. In this case, the reflection face S2 has power, and it is possible to miniaturize the lens array 5. In addition, there is an advantage in obtaining the bright erection image. However, when the reflection face S2 is the curved face, the resolution may be decreased. In variation 3, the lens faces S1 and S3 are the free curved faces to improve the resolution.

In variation 4, the lens faces S1 and S3 are aspheric faces, and the reflection face S2 is the curved face, to improve the decrease of resolution. Since it is possible to suppress the occurrence of color aberration of the reflection face S2 by the free curved face, the degree of freedom in design is high and it is possible to suppress the decrease of resolution and the color aberration as compared with variation 3.

In variation 5, since all of the lens faces S1 and S3 and the reflection face S2 are the free curve faces, the degree of freedom in design is highest and the resolution is most satisfactory of the embodiments shown in FIG. 5.

The invention is not limited to the embodiments, and may be variously modified within the scope which does not deviate from the concept, in addition to the description. For example, in the first embodiment, the incident unit 51 including the plurality of lens faces S1, the connection unit 52, and the output unit 53 including the plurality of lens faces S3 are integrally formed, then one reflection film 54 is provided on the outer peripheral face of the connection unit 52 to produce the lens array 5, but the method of producing the lens array 5 is not limited thereto, for example, may be configured in the following method. That is, the incident unit 51 including one lens face S1, the connection unit 52 and the output unit 53 including one lens face S3 may be integrally formed, then one reflection film 54 may be integrally provided on the outer peripheral face of the plurality of connection units 52 to configure the "reflection face S2 based on film formation", thereby the lens array 5.

In the first embodiment, the plurality of image forming optical elements provided with the lens formed by integrating the incident unit including one lens face S1, the connection unit 52, and the output unit 53 including one lens face S3 by the transparent medium, and the reflection film 54 provided on the outer peripheral face of the connection unit 52 are integrated in the X direction, but the plurality of image forming optical elements may be arranged in the X direction to configure the lens array 5.

In the second embodiment, the plurality of image forming optical elements formed by integrating the incident unit including one lens face S1, the connection unit 52 including the total reflection face S2, and the output unit 53 including one lens face S3 by the transparent medium are integrated in the X direction, but the plurality of image forming optical elements may be arranged in the X direction to configure the lens array 5.

Figure 6:
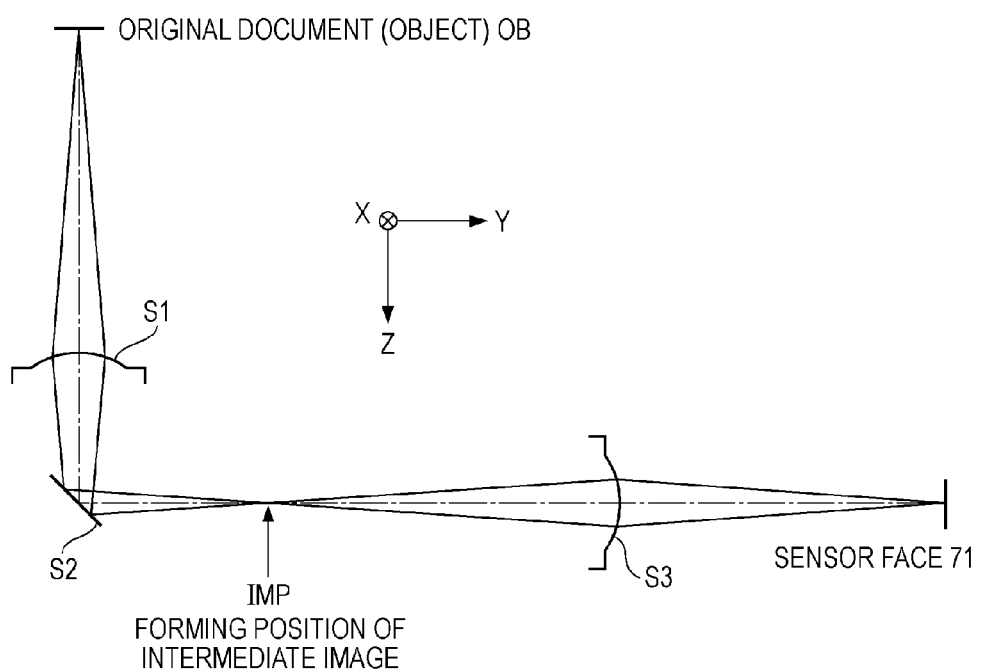
FIG. 6 is a light beam diagram illustrating a specific example of variation 1.

FIG. 6 to FIG. 9 are diagrams illustrating specific examples of variation 1 shown in FIG. 5. FIG. 6 is a light beam diagram illustrating a specific example of variation 1 shown in FIG. 5. FIG. 7 is a diagram illustrating lens data of the specific example shown in FIG. 6. FIG. 8 is a diagram illustrating a numerical formula defining the face shape of the lens face. FIG. 9 is a diagram illustrating data providing the face shape of the lens face shown in FIG. 8 in the specific example shown in FIG. 6.

As can be seen from the drawings, the face S1 is the incident side lens face of the lens array 5, and may be finished in the aspheric shape. The face S2 is the plane-shaped reflection face. The face S3 is the output side lens face of the lens array 5, and has a shape symmetric with the face S1.

In the embodiment 1 configured as described above, as shown in FIG. 6, the light beams passing through each incident side aperture 41 (FIG. 2) and input to the lens face S1 among the light beams reflected by the original document OB is collected between the reflection face S2 and the lens face S31, that is, at the position IMP in the output unit 53 by the lens face S1, and an inverted image of the original document is formed as the intermediate image. The light beams output from the intermediate image are collected on the sensor face 71 by the lens face S3, and the inverted image of the intermediate image, that is, the erection image of the original document OB is formed substantially at the equal magnification. As described above, according to the lens array 5 of variation 1, it is possible to form the erection image of the original document OB with a simple configuration without needing the positioning with high precision.

Figure 10:
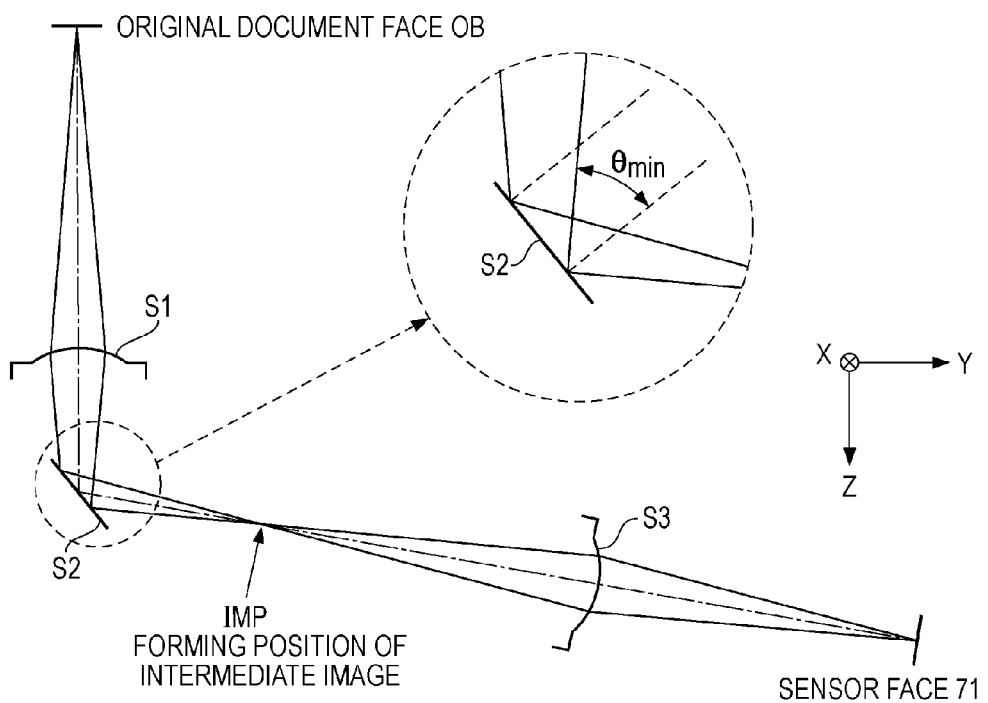
FIG. 10 is a light beam diagram illustrating another specific example of variation 1.

FIG. 10 to FIG. 12 are diagrams illustrating other specific examples of variation 1 shown in FIG. 5. FIG. 10 is a light beam diagram illustrating another specific example of variation 1 shown in FIG. 5. FIG. 11 is a diagram illustrating lens data of the specific example shown in FIG. 10. FIG. 12 is a diagram illustrating data providing the face shape of the lens face shown in FIG. 8 in the specific example shown in FIG. 10.

As can be seen from the drawings, the face S1 is the incident side lens face of the lens array 5, and may be finished in the aspheric shape. The face S2 is the plane-shaped total reflection face, and the smallest incident angle $\theta$min of the incident angles of the light beams input to the total reflection face S2 is larger than the threshold angle $\theta$ as shown at the broken part of FIG. 10. The face S3 is the output side lens face of the lens array 5, and has a shape symmetric with the face S1.

In the first embodiment configured as described above, as shown in FIG. 10, the light beams passing through each incident side aperture 41 (FIG. 4) and input to the lens face S1 among the light beams reflected by the original document OB is collected between the total reflection face S2 and the sensor face 71, that is, at the position IMP in the output unit 53 by the lens face S1, and an inverted image of the original document is formed as the intermediate image. The light beams output from the intermediate image are collected on the sensor face 71 by the lens face S3, and the inverted image of the intermediate image, that is, the erection image of the original document OB is formed substantially at the equal magnification. As described above, according to the lens array 5 of variation 1, it is possible to form the erection image of the original document OB with a simple configuration without needing the positioning with high precision.

Figure 13:
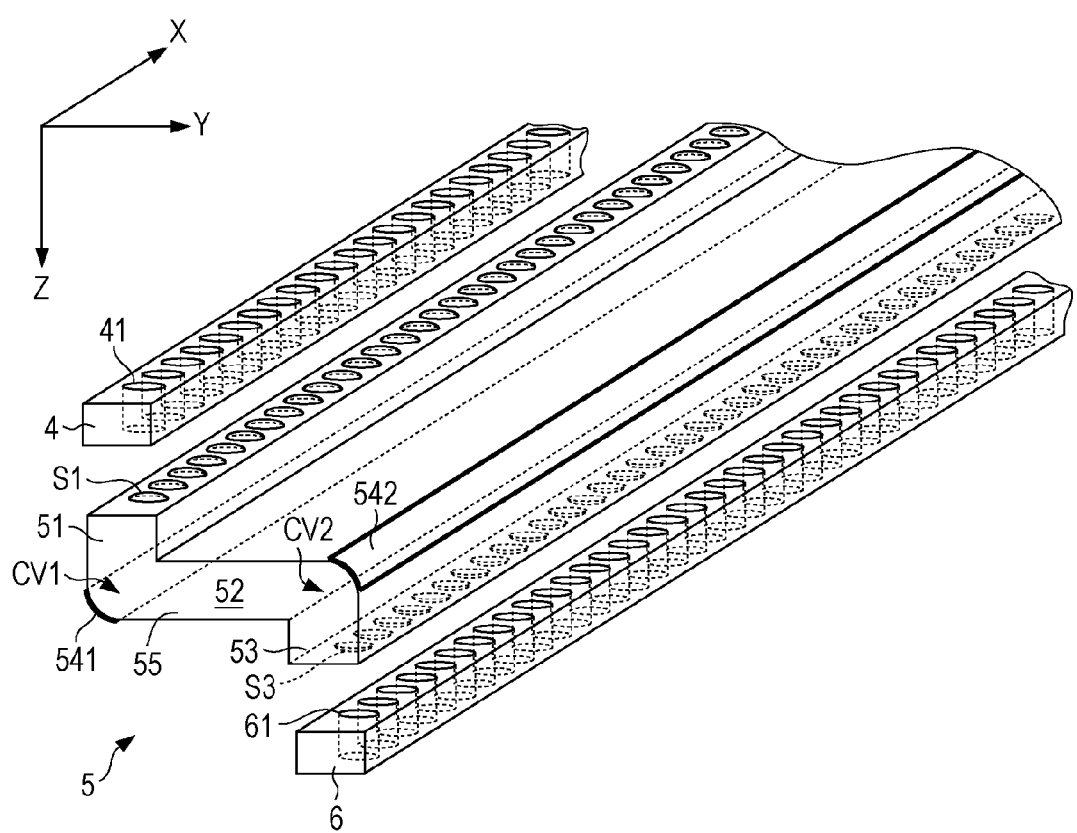
FIG. 13 is a perspective view illustrating a lens array of an image reading device according to a third embodiment of the invention.
Figure 14:
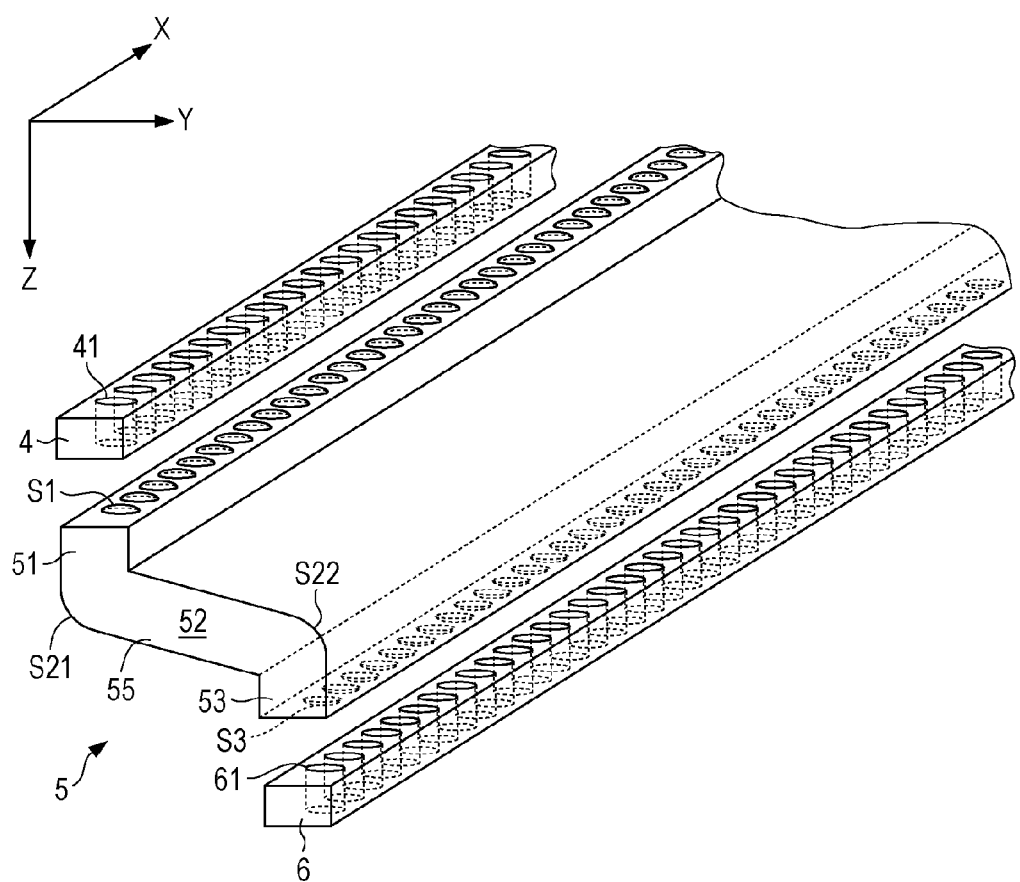
FIG. 14 is a perspective view illustrating a lens array of an image reading device according to a fourth embodiment of the invention.

In the embodiments, the light is reflected once by the reflection face S2 formed on the connection unit 52 of the lens array 5 and the reflection film 54, but it is not limited thereto. That is, an aspect of reflecting the light twice with respect to the connection unit 52 may be assumed. FIG. 13 shows a lens array according to a third embodiment, and FIG. 14 shows a lens array according to a fourth embodiment. In the third embodiment, the connection unit 52 directly connects the incident unit 51 and the output unit 53. In the fourth embodiment, the connection unit 52 obliquely connects the incident unit 51 and the output unit 53.

First, FIG. 13 will be described. In the third embodiment, the connection unit 52 is formed of an incident unit 51 growing in the Z direction, left and right portions 55 curved from the lower end of the incident unit 51 and extending to the right side, and an output unit 53 curved from the right end of the left and right portions 55 and extending downward. That is, the connection unit 52 has a shape perpendicularly curved by a first curve portion CV1 from the incident unit 51 to the left and right portions 55 and perpendicularly curved by a second curve portion CV2 from the left and right portions 55 to the output unit 53.

On the upper face of the incident unit 51, a plurality of incident side lens faces S1 corresponding to, one-to-one, a plurality of through-holes 41 of the incident side aperture member 4 are formed in a line at a predetermined pitch in the X direction. On the lower face of the output unit 53 of the connection unit 52, a plurality of output side lens faces S3 corresponding to, one-to-one, a plurality of incident side lens faces S1 are formed in a line at a predetermined pitch in the X direction. Accordingly, the illumination light input to the incident side lens face S1 is led to the output side lens face S3 by the connection unit 52.

In the connection unit 52, a first reflection film 541 and a second reflection film 542 are formed to lead the incident light from the incident side lens face S1 to the output side lens face S2. The first reflection film 541 is a metal film evaporated on the outer peripheral face of the first curve portion CV1 curved from the incident unit 51 of the connection unit 52 to the left and right portions 55, and reflects the illumination light input from the incident side lens face S1 to the second curve portion CV2. The second reflection film 542 is a metal film evaporated on the outer peripheral face of the second curve portion CV2 curved from the left and right portions 55 of the connection unit 52 to the output unit 53, and reflects the illumination light reflected by the first reflection film 541 to the output side lens face S2. As a result, the light input to the incident side lens face S1 is reflected by the first reflection film 541 and the second reflection film 542, and is led to the output side lens face S2.

The plurality of incident side lens faces S1, the connection unit 52, and the plurality of output side lens faces S2 are integrally formed by the transparent medium such as resin and glass having optical permeability with respect to the illumination light. Accordingly, the illumination light input to the incident side lens face S1 travels in the transparent medium until reaching the output side lens face S2 from the incident side lens face S1 through the first reflection film 541 and the second reflection film 542.

As a result, the illumination light passing through the lens array 5 is output from the output side lens face S2, and then forms an image at magnification of erection equal-magnification. In the formation of the lens array 5, the units (for example, the incident side lens face S1, the connection unit 52, and the output side lens face S2) may be separately formed, then they may be adhered and integrated, and the whole of the lens array 5 may be integrally formed without separately forming the units.

On the anti-connection unit side of the output unit 53, the output side aperture member 6 is disposed in the lower space, that is, at the position just under the light guide 31, to be interposed between the lens array 5 and the sensor 7. similarly to the incident side aperture member 4, the output side aperture member 6 also has substantially the same length as the reading range, and is provided along the X direction, a plurality of through-holes 61 are provided in a line in the X direction to serve as the output side apertures with respect to the output side lens faces S3. For this reason, the output side lens faces S3 form the intermediate images corresponding thereto on the sensor face 71 of the sensor 7 to form the erection image of the original document OB.

Next, FIG. 14 will be described. In the fourth embodiment, the left and right portions 55 of the lens array 5 are provided slightly obliquely downward from the incident unit 51 to the output unit 53.

That is, the left and right portions 55 of the lens array 5 has a first reflection face S21 and a second reflection face S22 to lead the incident light from the incident side lens face S1 to the output side lens face S2. The first reflection face S21 is formed on an outer peripheral wall at a part curved from the incident unit 51 to the left and the light portions 55.

That is, an inner interface of the outer peripheral face totally reflects the illumination light from the incident side lens face S1 to serve as the first reflection face S21. Meanwhile, the second reflection face S22 is formed on an outer peripheral wall at a part curved from the left and right portions 55 to the output unit 53. That is, an inner interface of the outer peripheral wall further totally reflects the illumination light totally reflected by the first reflection face S21 to the output side lens face S2 to serve as the second reflection face S22.

The illumination light totally reflected by the second reflection face S22 is output from the output side lens face S2.

The plurality of incident side lens faces S1, the left and right portions 55, and the plurality of output side lens faces S2 are integrally formed by the transparent medium such as resin and glass having optical permeability with respect to the illumination light. Accordingly, the illumination light input to the incident side lens face S1 travels in the transparent medium until reaching the output side lens face S2 from the incident side lens face S1 through the first reflection face S21 and the second reflection face S22.

The illumination light passing through the lens array 5 as described above is output from the output side lens face S2, and then forms an image at magnification of erection equal-magnification.

Even in the third embodiment and the fourth embodiment, the same effects as those of the first embodiment and the second embodiment are obtained.

What is claimed is:

1. An image forming optical element in which an incident unit having a first lens face to which a light beam output from an object is input, an output unit having a second lens face outputting the light beam, and a bent unit connecting the incident unit and the output unit at an angle are integrally formed into a transparent medium,
    wherein the bent unit has a reflection face reflecting an incident light beam input to the first lens face and guiding the incident light beam to the second lens face, and
    wherein an intermediate image of the object is formed once in the bent unit or the output unit, the intermediate image being formed at a focus position between the reflection face and the second lens face closer to the reflection face than to the second lens face, the intermediate image being used to form an erection image of the object on an output side of the second lens face.

2. The image forming optical element according to claim 1, wherein a reflection film is disposed on an outer peripheral face of the bent unit to form the reflection face.

3. The image forming optical element according to claim 2, wherein the outer peripheral face of the bent unit has a plane shape, the first lens face and the second lens face have face shapes symmetric with each other, and the erection image of the object is formed at equal magnification.

4. The image forming optical element according to claim 2, wherein the outer peripheral face of the bent unit has a curved shape.

5. An image forming optical array, wherein a plurality of the image forming optical elements according to claim 2 are integrally arranged.

6. The image forming optical array according to claim 5, wherein the plurality of lens are integrally shaped to form a lens array, and
    wherein a plurality of the reflection films are integrally provided on outer peripheral faces of a plurality of the bent units.

7. The image forming optical array according to claim 5, wherein at least one of the first lens face and the second lens face has a face shape different in an arrangement direction of arranging the image forming optical elements and a perpendicular direction perpendicular to the arrangement direction.

8. An image reading device comprising:
    a light source unit that irradiates an object with light;
    the image forming optical element according to claim 2; and
    a reading unit that reads an erection image formed by the image forming optical element.

9. The image forming optical element according to claim 1, wherein the reflection face is a total reflection face that totally reflects the light.

10. The image forming optical element according to claim 9, wherein the total reflection face has a plane shape, the first lens face and the second lens face have face shapes symmetric with each other, and the erection image of the object is formed at equal magnification.

11. The image forming optical element according to claim 9, wherein the total reflection face has a curved shape.

12. An image forming optical array, wherein a plurality of the image forming optical elements according to claim 9 are integrally arranged.

13. The image forming optical array according to claim 12, wherein at least one of the first lens face and the second lens face has a face shape different in an arrangement direction of arranging the image forming optical elements and a perpendicular direction perpendicular to the arrangement direction.

14. An image reading device comprising:
- a light source unit that irradiates an object with light;
- the image forming optical element according to claim 9; and
- a reading unit that reads an erection image formed by the image forming optical element.

15. The image forming optical element according to claim 1, wherein a reflection film is disposed on an outer peripheral face of the bent unit to form the reflection face.

16. The image forming optical element according to claim 1, wherein a total reflection face that totally reflects the incident light beam is formed as the reflection face in the bent unit.

17. The image forming optical element according to claim 1, wherein the reflection face has a plane shape, the first lens face and the second lens face have face shapes symmetric with each other, and the erection image of the object is formed at equal magnification.

18. The image forming optical element according to claim 1, wherein the reflection face has a curved shape.

19. An image forming optical array, wherein a plurality of the image forming optical elements according to claim 1 are integrally arranged.

20. The image forming optical array according to claim 19, wherein at least one of the first lens face and the second lens face has a face shape different in an arrangement direction of arranging the image forming optical elements and a perpendicular direction perpendicular to the arrangement direction.

21. An image reading device comprising:
- a light source unit that irradiates an object with light;
- the image forming optical element according to claim 1; and
- a reading unit that reads an erection image formed by the image forming optical element.

* * * * *